Oct. 20, 1936.   J. D. DURANT   2,058,067
CONDITION DISCLOSING APPARATUS
Filed Sept. 22, 1933   3 Sheets-Sheet 1
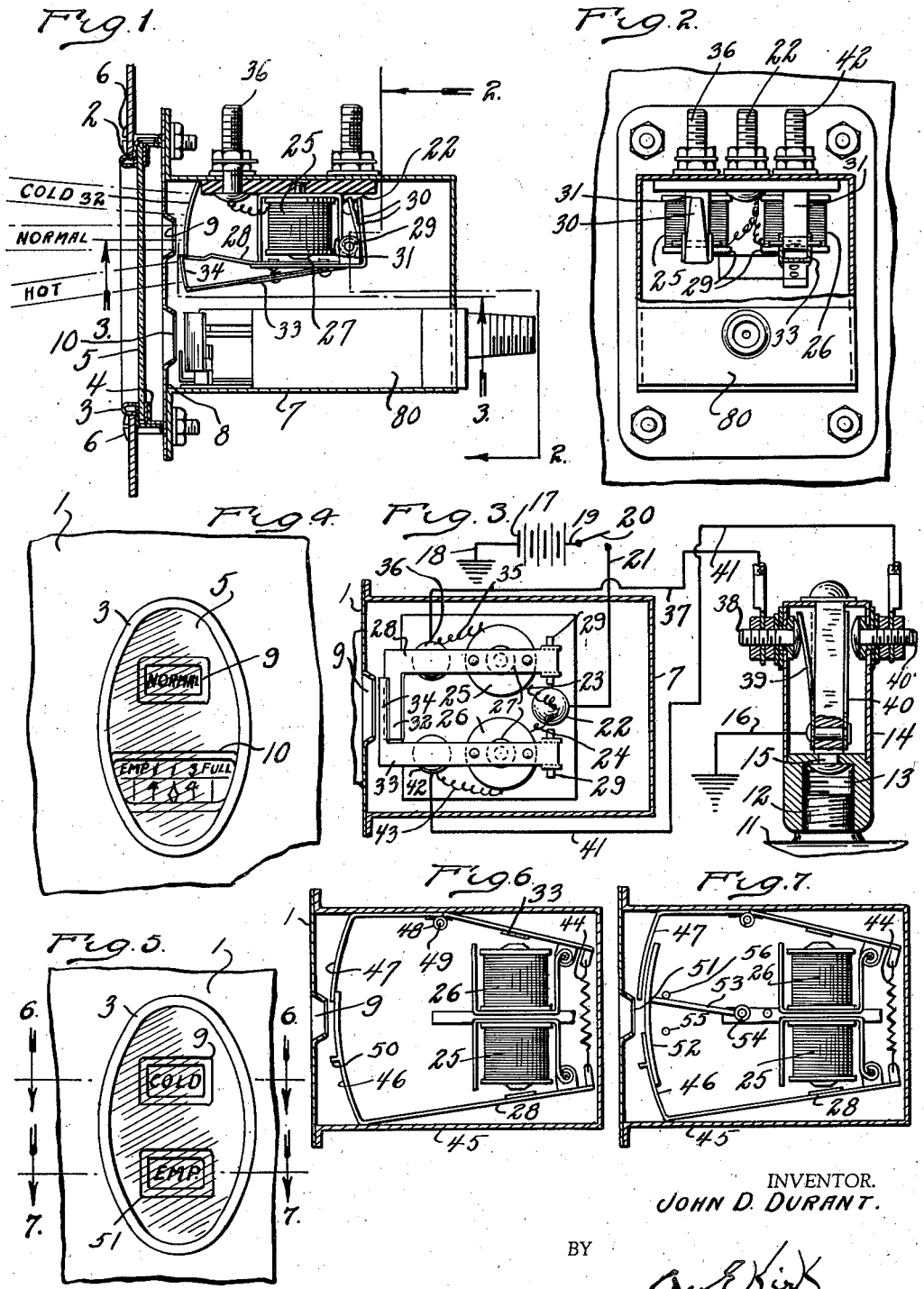
INVENTOR.
JOHN D. DURANT.
BY
ATTORNEY.

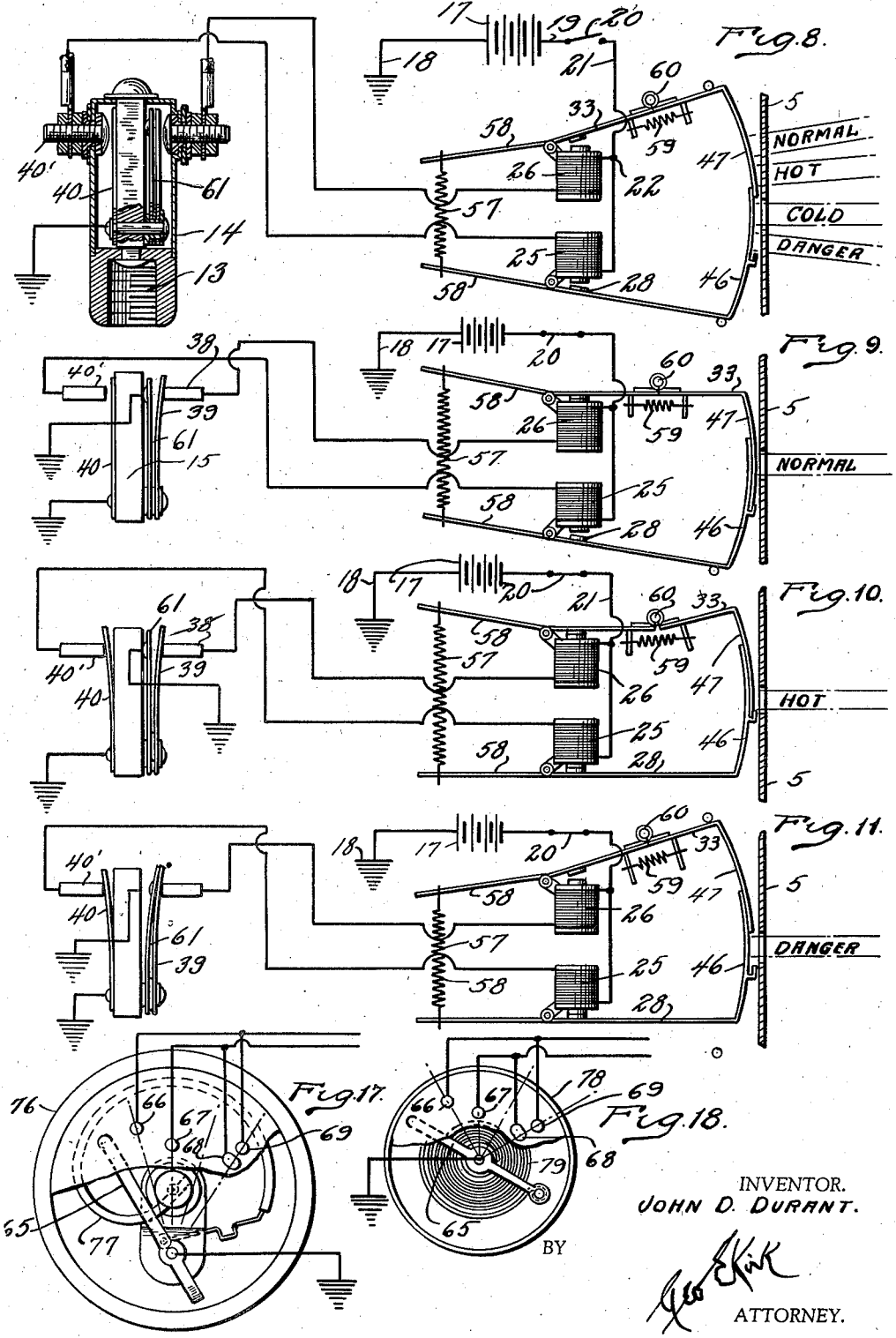

Oct. 20, 1936.　　　　　J. D. DURANT　　　　　2,058,067
CONDITION DISCLOSING APPARATUS
Filed Sept. 22, 1933　　　3 Sheets-Sheet 3
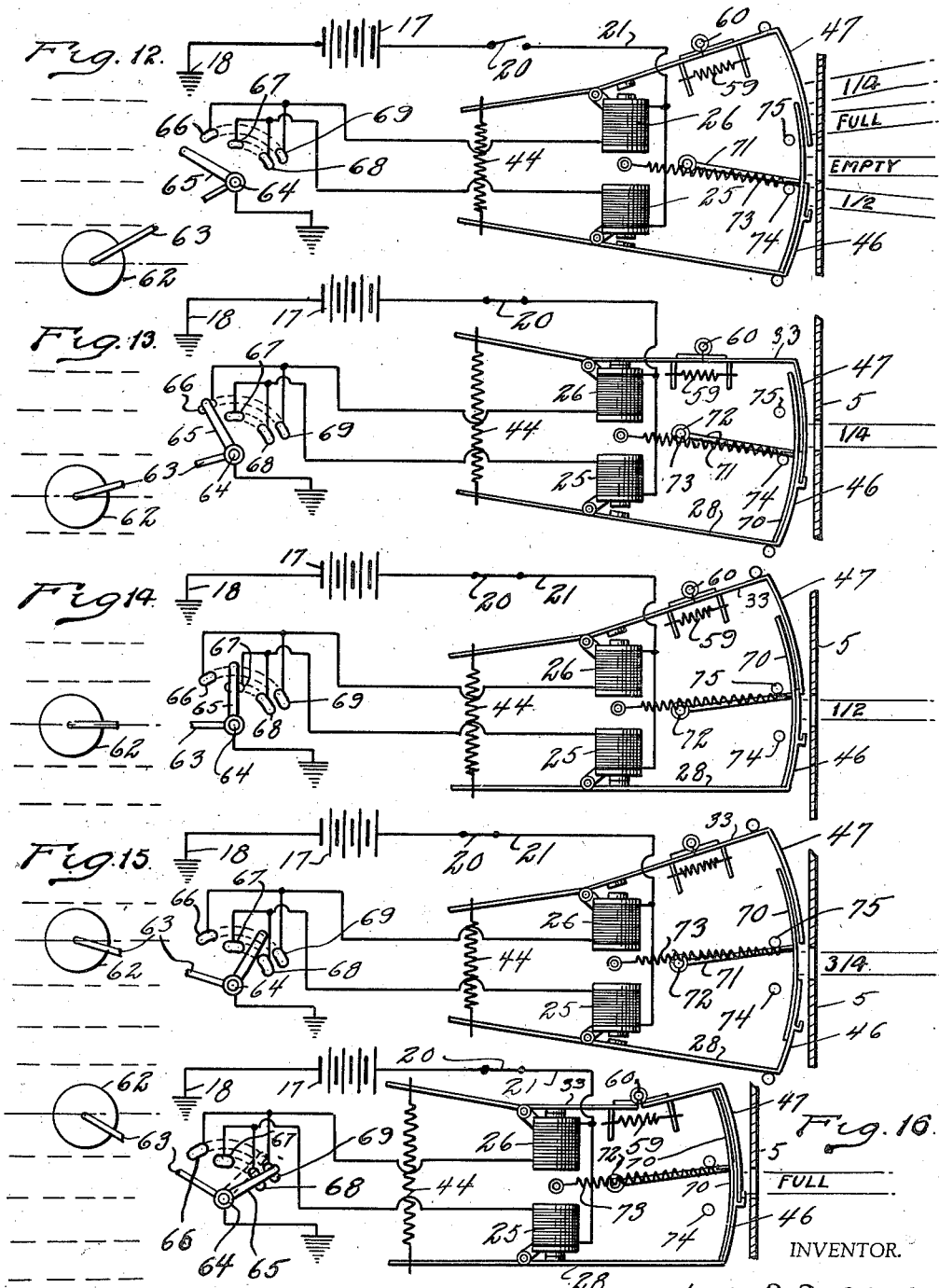
INVENTOR.
JOHN D. DURANT.
BY
ATTORNEY.

Patented Oct. 20, 1936

2,058,067

UNITED STATES PATENT OFFICE 2,058,067

CONDITION DISCLOSING APPARATUS

John D. Durant, Adrian, Mich., assignor to Schwarze Electric Company, Adrian, Mich., a corporation of Michigan Application September 22, 1933, Serial No. 690,599

2 Claims. (Cl. 177—311)

This invention relates to devices, movable due to condition change to which exposed, and mechanical and electrical connections therefrom to impart what change has taken place.

This invention has utility when incorporated in instrument panels, as of motor vehicles, to display indications relevant to the power plant, as liquid level for fuel and oil, oil pressure, or temperature of the motor or any combination thereof, and cooperating more particularly for a plurality of conditions to be guiding in vehicle operation.

Referring to the drawings:

Fig. 1 is a vertical sectional view through an embodiment of the invention for thermostatic response, and is assembled in the panel of an instrument board on the dash of an automobile, say of the internal combustion motor propelled type;

Fig. 2 is a section on the line 2—2, Fig. 1;

Fig. 3 is a section on the line 3—3, Fig. 1; together with a thermostatic control circuit therefor;

Fig. 4 is a front view of the device of Fig. 1;

Fig. 5 is a view similar to Fig. 4, with additional adaptation of the invention herein for liquid level disclosing condition, as well as temperature indication;

Fig. 6 is a section on the line 6—6, Fig. 5;

Fig. 7 is a section on the line 7—7, Fig. 5;

Fig. 8 is a view of a thermo-responsive switch, a circuit therefrom, and the display as idle, or on open circuit, which position of the display would not be changed were the motor cold;

Fig. 9 is a view similar to Fig. 8, but with the circuit closed and effective for normal temperature display;

Fig. 10 is a view similar to Fig. 9, but with the display disclosing a hot condition;

Fig. 11 is a view similar to Fig. 9, but with the danger signal;

Fig. 12 is a view of a liquid level condition selective switch, a circuit therefrom, the display at idle, or on open circuit, which position of the display would not be changed if the reservoir or tank were empty;

Fig. 13 is a view similar to Fig. 12, but with the circuit closed and effective for one-fourth full liquid level disclosure;

Fig. 14 is a view similar to Fig. 13, but disclosing the condition of the reservoir to be one-half full;

Fig. 15 is a view similar to Fig. 12, with the display in this instance as for the liquid reserve tank three-fourths full;

Fig. 16 is a view similar to Fig. 12, but showing that the tank of fuel or gasolene is full;

Fig. 17 shows, instead of the bimetallic plate or flexing leaf type of electric switch of Fig. 8, an arc tube containing an expansible fluid, of the general Bourdon type, to swing a pivoted or rocker arm type of switch; and Fig. 18 shows a bimetallic spiral type of temperature responsive switch, with the arm therein also pivoted.

Motor vehicle instrument board 1 is shown with opening 2 therein in a location convenient for observation by the driver of the vehicle. Framing seats 3, 4, are assembled with transparent material or glass 5 therebetween, for location in the opening 2 by bolts 6, which also mount housing 7 with its front 8 adjacent the glass 5. The front 8 has port 9 for temperature disclosure and port 10 for fuel tank liquid level display. It is to be understood these ports and their purpose, as well as location, may conform to conveniences in practice, whether temperature, pressure or quantity, or the motor performance condition, or liquid condition of oil, jacket cooling medium, or fuel.

Head 11 of the internal combustion engine is shown provided with assembly bolt 12 having an externally threaded terminus to be engaged by internally threaded fitting or nut 13 carrying housing 14 assembled with the fitting 13 by rivet 15, serving as ground 16. The casing 14 is cylindrical and fits on a cylindrical seat in the top of the nut 13. The shaft of the rivet 15 is round and is rotatable at the opening at the top of the nut 13. The body of the member 15 is square and keyed in an opening at the top of the casing 14 thus providing a swivel mounting for the switch member. Car battery 17 has ground 18 and line 19 therefrom to manually operable switch 20 connected by line 21 to terminal 22 having insulation mounting in the housing 7. From this terminal 22 extend leads 23, 24, respectively to coils 25, 26, providing multi-control windings for the solenoids having cores 27. The coil 25 as energized acts upon armature 28 having pivotal mounting 29. Upstanding tail extension 30 abuts bracket 31, which mounts the pivot bearing 29. The extension thus determines the idle or drop position for display terminus 32 as Cold.

Armature 33 of the coil 26 has pivot bearing mounting 29 and upstanding extension 30 locating its display offset 34 clear of the port 9 at idle position. From the coil 25 is lead 35 to terminal 36 insulated from the housing 7. The terminal 36 is connected by line 37 with terminal 38 insulated from the housing 14. Heating of bimetallic plate element 39 causes it to operate as a temperature condition selective switch in flexing to the terminal 38 to complete the circuit as closed by the switch 20. The solenoid 25 as thus energized actuates its armature 28 so to shift the offset 32 that Normal display at the port 9. In the event the motor temperature be sufficient to flex plate 40, responsive to higher temperature than the similar plate 39, the circuit is closed at terminal 40', through line 41, terminal 42, lead 43, to energize the coil 26, effecting shifting of the armature 33 so that the offset 34 blanks off the Normal display at the port 9 and discloses in its stead Hot, for the guidance of the vehicle driver that the engine is operating in need of more water in the water jacket, more or change of oil, spark plug trouble, or that there exists a condition requiring attention for desirable upkeep and performance.

With the switch 20 of the push button type, readings may be taken on occasion as desired, and there is not current consumption to load the wiring installation.

The device of Fig. 1 shows the solenoids axially parallel. In Fig. 6, the coils are aligned. In lieu of gravity reset, tension helical spring 44, normally urges the displays to idle position. The sides of housing 45 determine the idle positions of display offsets 46, 47. At the operation of armature 33, torsion spring 48 at hinge 49 holds offset 47 for one display, but when the armature 28 is effective, the offset 46 has lug 50 shove the offset 47 to flex the hinge 49.

Even an additional display may be at window or port 51 (Figs 5, 7) due to frictional plate 52 mounted by arm 53 from bearing 54. Offsets 46, 47, may here give display for liquid level condition, with the offset 46 acting for the frictional control as limited by pins 55, 56, for the arm 53.

Four readings, with three shifted positions, with but two solenoids is attained, as for temperature disclosure, in Fig. 8. Tension helical spring 57, similar to the spring 44, acts upon extensions 58 from armatures 28, 33. Spring 59 introduces the yielding factor at hinge joint 60 for the co-operation between the display offsets 46, 47. In this assembly it is to be noted that due to additional thermo-responsive leaf switch 61 and variation of the circuits, either or both solenoids may be simultaneously energized. It is to be noted that with both solenoids energized (Fig. 10), then the hinge 60 is flexed, which shifts the offset 47 from its Normal position of display to Hot, but that with only armature 28 energized, the display is Danger.

Float 62 (Fig. 12) which may be in the fuel tank of the automobile, has arm 63 therefrom to bearing 64, with additional switch arm 65 isolated from the fuel region and there shiftable to contacts 66, 67, 68, 69, for cutting in either or both of the solenoids. Additionally, it is to be noted there is the supplemental display of plate 70 alternately shifted by the offsets 46, 47, and the plate 70 is carried by arm 71 from pivot bearing 72 and tripped by tension spring 73 to be lodged at pins 74, 75. After separate solenoid operation, the setting of the plate 70 by offset 46 is from Empty (Fig. 12) to three-fourths full (Fig. 15).

Instead of fitting 13, temperature responsive action may be had by positioning for such action housing 76 (Fig. 17) and Bourdon tube 77 may thus have its fluid contents tend to straighten this tube as temperature rises, thereby rocking switch arm 65 to one of the contacts 66, 67, 68, 69.

Housing 78 for temperature response is shown with bimetallic spiral 79 for unwinding as heated and thus swinging arm 65 to temperature condition selected contacts 66, 67, 68, 69, completing circuits through such switch arm 65 and the ground 16.

As shown in Fig. 1, either one of these multi-disclosure units may be incorporated within the same housing with a pressure operated indicating instrument 80 as in the instance of a combination engine temperature and oil pressure disclosing instrument.

Insofar as there may be common subject-matter, this case is a continuation in part of application Ser. No. 672,863 filed May 25, 1933.

It is to be noted that the internally threaded fitting 13, which may be say of square or hexagonal type, in practice instead of engaging the protruding end of the bolt say in the head block of the motor, may be substituted for the nut on such bolt. There is thus provided a direct metallic heat conductive connection from the motor cylinders to the thermo-responsive device as in the disclosure herein. The equipment may accordingly be used in conjunction with air cooled as well as water cooled type of internal combustion engines.

In this assembly, there is safeguard for maintaining accuracy in the set up of the thermostats in that the member 15 has its assembly with the nut 13 of the rivet type and swiveled. While the body of this member 15 is rectangular as rising from the nut and, as such rectangle, may serve as the keying assembly with the housing 14. This serves to keep the electric terminals 38, 40' in alignment with the respective contacts 39, 40. Definite mounting in a predetermined fixed angular position may thus be had for the shell 14 notwithstanding even slight shiftings of the nut 13 may be desirable to effect tightening thereof. This is a direct metallic conductor. It is sensitive to the temperature conditions of the motor.

What is claimed and it is desired to secure by Letters Patent is:

1. An indicating instrument of the class described comprising a casing having a window opening formed therein, a pair of oppositely disposed arms, each having an offset curved shutter portion at one end provided with spaced indicia for display through said window, means for pivotally mounting said arms so that said shutter portions overlap slightly at their ends, a spring connecting the ends of the arms opposite the shutter portions, stop means carried by said casing for holding said arms in a normal or inoperative position, one of said arms consisting of two sections, means for pivotally connecting said sections together in such a manner that one section can be partially rotated with respect to the other in one direction only to form a bent arm, said connection having means for normally biasing said sections to form a substantially straight arm, a stop mounted on one of said shutters for engaging the free end of the other shutter and means including a pair of electromagnets one for each arm for partially rotating said arms against the action of said spring.

2. An indicating instrument of the class described comprising a casing having a window opening formed therein, a pair of oppositely disposed arms, each having an offset curved shutter portion at one end provided with spaced indicia for display through said window, means for pivotally mounting said arms so that said shutter portions overlap slightly at their ends, means biasing said shutters for movement away from each other, said instrument including stop means for holding said arms in a normal or inoperative position, one of said arms consisting of two sections, means for pivotally connecting said sections together in such a manner that one section can be partially rotated with respect to the other in one direction only to form a bent arm, said connection having means for normally biasing said sections to form a substantially straigh arm, a stop mouned on one of said shutters for engaging the free end of the other shutter and means including a pair of electromagnets one for each arm for partially rotating said arms against the action of said spring.

JOHN D. DURANT.